US011100783B2

(12) United States Patent
Romano et al.

(10) Patent No.: US 11,100,783 B2
(45) Date of Patent: *Aug. 24, 2021

(54) VOICE, VIDEO, AND DATA [VVD] CENTRIC ADAPTIVE EMERGENCY RESPONSE GLOBAL CHAIN OF CUSTODY APPARATUS AND METHOD

(71) Applicants: Michael Romano, Lake Mary, FL (US); Margaret May Arminas DeFilippo, Winter Park, FL (US)

(72) Inventors: Michael Romano, Lake Mary, FL (US); Margaret May Arminas DeFilippo, Winter Park, FL (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/503,940

(22) Filed: Jul. 5, 2019

(65) Prior Publication Data
US 2019/0325732 A1    Oct. 24, 2019

Related U.S. Application Data

(63) Continuation-in-part of application No. 16/119,761, filed on Aug. 31, 2018, now Pat. No. 10,390,203, which is a continuation-in-part of application No. 15/586,474, filed on May 4, 2017, now abandoned.

(60) Provisional application No. 62/331,940, filed on May 4, 2016.

(51) Int. Cl.
| | | |
|---|---|---|
| *H04W 4/90* | (2018.01) | |
| *G08B 25/00* | (2006.01) | |
| *H04N 7/18* | (2006.01) | |
| *H04W 4/18* | (2009.01) | |

(52) U.S. Cl.
CPC .......... *G08B 25/005* (2013.01); *H04N 7/185* (2013.01); *H04W 4/185* (2013.01); *H04W 4/90* (2018.02)

(58) Field of Classification Search
CPC ........ H04W 4/90; H04W 4/14; H04W 4/025; H04W 76/50; H04M 1/72538; H04M 11/045; H04M 2242/04
See application file for complete search history.

(56) References Cited

U.S. PATENT DOCUMENTS

| | | | | |
|---|---|---|---|---|
| 2006/0262907 | A1* | 11/2006 | Diroo | H04W 76/50 379/45 |
| 2009/0143045 | A1* | 6/2009 | Graves | A61B 5/411 455/404.1 |
| 2010/0075628 | A1* | 3/2010 | Ye | H04W 4/90 455/404.2 |
| 2012/0149324 | A1* | 6/2012 | Daly | H04W 4/14 455/404.1 |
| 2013/0077766 | A1* | 3/2013 | Keller | H04M 3/5116 379/45 |
| 2013/0171957 | A1* | 7/2013 | Sennett | H04W 4/02 455/404.1 |

(Continued)

*Primary Examiner* — Mehmood B. Khan
(74) *Attorney, Agent, or Firm* — The Patent Guild; Paul Royal, Jr.

(57) ABSTRACT

A multimedia centric event (emergency or non-emergency) response communications method and apparatus for providing a chain of custody of Selected Voice, Selected Video, and Selected Data about an event, the method being executed by a network connected computer system having a processor, a machine-readable memory, and a Chain of Custody Network which includes at least an Admissible Content Database and a chain of custody computer application.

20 Claims, 11 Drawing Sheets

(56) References Cited

U.S. PATENT DOCUMENTS

| | | | | |
|---|---|---|---|---|
| 2014/0206308 A1* | 7/2014 | Hatton | ................... | G08B 25/10 |
| | | | | 455/404.2 |
| 2014/0368601 A1* | 12/2014 | deCharms | ............... | H04L 67/26 |
| | | | | 348/14.02 |
| 2016/0087942 A1* | 3/2016 | Yaguchi | ................. | H04L 63/08 |
| | | | | 726/4 |
| 2016/0088463 A1* | 3/2016 | Stanke | .................... | H04W 8/18 |
| | | | | 455/404.1 |
| 2016/0132981 A1* | 5/2016 | Cherry | ................... | G06Q 10/00 |
| | | | | 705/325 |
| 2016/0255483 A1* | 9/2016 | Parlamas | ................ | H04W 4/90 |
| | | | | 455/404.2 |
| 2016/0373440 A1* | 12/2016 | Mather | ............... | H04L 63/0861 |

\* cited by examiner

UNIQUE CHAIN OF CUSTODY IDENTIFIER EXAMPLE 1

| 0 7 0 1 2 0 1 9 | 3 5 R 5 3 E R K D O P K * D B P K L N D W I A ! X J ! P L Z R Q H D J P F 6 3 9 U F | |
|---|---|---|
| DATE | IMEI TYPE ALLOCATION CODE | UNIQUE KEY GENERATED BY THE ADMISSIBLE NETWORK |
| GROUP 1 | GROUP 2 | GROUP 3 |

GROUP 1 = Date Comminication Received
GROUP 2 = Device IMEI [International Equipment Identifier] Type Allocation Code
GROUP 3 = Unique Key Generated by The Admissible Network

FIG. 4

UNIQUE CHAIN OF CUSTODY IDENTIFIER EXAMPLE 2

| 0 7 0 1 2 0 1 9 | 3 5 R 5 3 E R K D O P K * D B | P K L N D W I A ! X J ! P L Z R Q H D J P F 6 3 9 U F |
|---|---|---|
| DATE | PHONE NUMBER | UNIQUE KEY GENERATED BY THE ADMISSIBLE NETWORK |
| GROUP 1 | GROUP 6 | GROUP3 |

GROUP 1 = Date Comminication Received
GROUP 6 = Phone Number
GROUP 3 = Unique Key Generated by The Admissible Network

FIG. 5

TABLE: ADMISSIBLE  FIG 6

| COLUMN | TYPE | SIZE | CHILD | PARENT |
|---|---|---|---|---|
| dt_created | datetime [19] | 20 | TABLE ADMISSIBLE | |
| phone_source | varchar | 18 | TABLE ADMISSIBLE | |
| phone_destination | varchar | 18 | TABLE ADMISSIBLE | |
| text_msg | varchar | 1200 | TABLE ADMISSIBLE | |
| media_link | varchar | 50 | TABLE ADMISSIBLE | |
| incident_number | varchar | 20 | TABLE ADMISSIBLE | |
| case_number | varchar | 20 | TABLE ADMISSIBLE | |
| notification_type | varchar | 12 | TABLE ADMISSIBLE | |
| first_name_rid | varchar | 18 | TABLE ADMISSIBLE | |
| last_name_rid | varchar | 18 | TABLE ADMISSIBLE | |
| device_type | varchar | 16 | TABLE ADMISSIBLE | |
| carrier | varchar | 2 | TABLE ADMISSIBLE | |
| imei_id | varchar | 16 | TABLE ADMISSIBLE | |
| location_lat | decimal [10, 8] | 18 | TABLE ADMISSIBLE | |
| location_lon | decimal (11, 8) | 19 | TABLE ADMISSIBLE | |
| exif_metadata | varchar | 3000 | TABLE ADMISSIBLE | |
| date_time | datetime [19] | 19 | TABLE ADMISSIBLE | |
| first_name | varchar | 18 | TABLE ADMISSIBLE | |
| last_name | varchar | 18 | TABLE ADMISSIBLE | |
| country_abbrev | varchar | 2 | TABLE ADMISSIBLE | |
| country_code | varchar | 3 | TABLE ADMISSIBLE | |
| phone_number | varchar | 15 | TABLE ADMISSIBLE | |
| channel_id | varchar | 3 | TABLE ADMISSIBLE | |
| coc_id | varchar | 50 | TABLE ADMISSIBLE | |
| custody_datetime1 | datetime [19] | 19 | TABLE ADMISSIBLE | |
| custody_name1 | varchar | 20 | TABLE ADMISSIBLE | |
| custody_agency1 | varchar | 20 | TABLE ADMISSIBLE | |
| custody_casenumber | varchar | 20 | TABLE ADMISSIBLE | |
| custody_victim | varchar | 20 | TABLE ADMISSIBLE | |
| custody_suspect | varchar | 20 | TABLE ADMISSIBLE | |
| custody_description | varchar | 100 | TABLE ADMISSIBLE | |
| custody_datetime2 | datetime [19] | 19 | TABLE ADMISSIBLE | |
| custody_name2 | varchar | 20 | TABLE ADMISSIBLE | |
| custody_agency2 | varchar | 20 | TABLE ADMISSIBLE | |
| custody_datetime3 | datetime [19] | 19 | TABLE ADMISSIBLE | |
| custody_name3 | varchar | 20 | TABLE ADMISSIBLE | |
| custody_agency3 | varchar | 20 | TABLE ADMISSIBLE | |

TABLE: RID  FIG 7

| COLUMN | TYPE | SIZE | CHILD | PARENT |
|---|---|---|---|---|
| primary_key | varchar | 20 | TABLE ADMISSIBLE | |
| dt_created | datetime [19] | 20 | TABLE ADMISSIBLE | |
| phone_source | varchar | 18 | TABLE ADMISSIBLE | |
| phone_destination | varchar | 18 | TABLE ADMISSIBLE | |
| text_msg | varchar | 1200 | TABLE ADMISSIBLE | |
| media_link | varchar | 50 | TABLE ADMISSIBLE | |
| incident_number | varchar | 20 | TABLE ADMISSIBLE | |
| case_number | varchar | 20 | TABLE ADMISSIBLE | |
| notification_type | varchar | 12 | TABLE ADMISSIBLE | |
| first_name_rid | varchar | 18 | TABLE ADMISSIBLE | |
| last_name_rid | varchar | 18 | TABLE ADMISSIBLE | |
| device_type | varchar | 16 | TABLE ADMISSIBLE | |
| carrier | varchar | 2 | TABLE ADMISSIBLE | |
| imei_id | varchar | 16 | TABLE ADMISSIBLE | |
| location_lat | decimal [10, 8] | 18 | TABLE ADMISSIBLE | |
| location_lon | decimal (11, 8] | 19 | TABLE ADMISSIBLE | |
| exif_metadata | varchar | 3000 | TABLE ADMISSIBLE | |
| date_time | datetime [19] | 19 | TABLE ADMISSIBLE | |
| first_name | varchar | 18 | TABLE ADMISSIBLE | |
| last_name | varchar | 18 | TABLE ADMISSIBLE | |
| country_abbrev | varchar | 2 | TABLE ADMISSIBLE | |
| country_code | varchar | 3 | TABLE ADMISSIBLE | |
| phone_number | varchar | 15 | TABLE ADMISSIBLE | |
| channel_id | varchar | 3 | TABLE ADMISSIBLE | |
| coc_id | varchar | 50 | TABLE ADMISSIBLE | |
| custody_datetime1 | datetime [19] | 19 | TABLE ADMISSIBLE | |
| custody_name1 | varchar | 20 | TABLE ADMISSIBLE | |
| custody_agency1 | varchar | 20 | TABLE ADMISSIBLE | |
| custody_casenumber | varchar | 20 | TABLE ADMISSIBLE | |
| custody_victim | varchar | 20 | TABLE ADMISSIBLE | |
| custody_suspect | varchar | 20 | TABLE ADMISSIBLE | |
| custody_description | varchar | 100 | TABLE ADMISSIBLE | |
| custody_datetime2 | datetime [19] | 19 | TABLE ADMISSIBLE | |
| custody_name2 | varchar | 20 | TABLE ADMISSIBLE | |
| custody_agency2 | varchar | 20 | TABLE ADMISSIBLE | |
| custody_datetime3 | datetime [19] | 19 | TABLE ADMISSIBLE | |
| custody_name3 | varchar | 20 | TABLE ADMISSIBLE | |
| custody_agency3 | varchar | 20 | TABLE ADMISSIBLE | |

| USER DEVICE | MODE | MODE | MODE |
|---|---|---|---|
| Citizen (2115) | CITIZEN | | |
| first First Responder (2116) | Watch Commander (2116WC) | Field Agent (2116FA) | Citizen (2115) |
| second First Responder (2117) | Watch Commander (2117WC) | Field Agent (2117FA) | Citizen (2115) |
| USER 1 (2118) | Data Retriever Event Commander (2118DREC) | Field Agent (2118DRAF) | Citizen (2115) |
| USER 2 (2119) | Data Retriever Event Commander (2119DREC) | Field Agent (2119DRAF) | Citizen (2115) |
| SOFTWARE | SOFTWARE | SOFTWARE | SOFTWARE |
| First Responder computer program application (2116B) | Citizen computer program application (2115A) | Data Retriever computer program application (2118B) | chain of custody computer application (1520) |

VOICE, VIDEO, AND DATA [VVD] CENTRIC ADAPTIVE EMERGENCY RESPONSE GLOBAL CHAIN OF CUSTODY APPARATUS AND METHOD

CROSS-REFERENCE TO RELATED APPLICATIONS

This application is a continuation-in-part of U.S. application Ser. No. 16/119/761, filed Aug. 31, 2018, which is a continuation-in-part of U.S. application Ser. No. 15/586,474, filed May 4, 2017, now abandoned, which claims the benefit of U.S. Provisional Application No. 62/331,940, filed May 4, 2016, now expired.

FIELD OF THE APPARATUS AND METHOD

The invention relates to the field of emergency response communications and, more particularly to systems and methods for dynamic distribution of multimedia and data files across an emergency response communications network and remote Citizen device controlled by First Responders.

BACKGROUND OF THE INVENTION

"Chain of custody" typically refers to the foundation the prosecution needs to establish for certain types of exhibits to be admitted into evidence. Exhibits are tangible objects that are relevant to the facts of a case—for example: photograph of a broken pane of glass in a burglary case, or the video of a robbery suspect during an armed robbery, car accidents.

Proving that an exhibit being offered into evidence is exactly what it purports to be and has not been exposed to tampering of the actual voice, video or data communication requires proof of who had possession of the exhibit at all times between the time the evidence was secured and the trial. This is the "Chain of Custody," and it's especially important to prove that exhibits have not been altered in some way prior to, during, or after the trial. In the event there is a finding of guilt and an appeal of the decision results in a retrial. then the Chain of Custody for voice, video and data evidence will need to be maintained thought out the prosecutorial process.

With the ever-increasing use of cell phones that are being used to capture every day events, cell phones are capturing more and more crimes and incidents such as accidents or robberies in real-time. In the case of cell phones, since photos and video clips will begin finding their way directly to Public Service Answering Points (PSAPs) and insurance companies, the initial collection point of critical evidence will be gathered, not by investigators or police who are dispatched after the incident occurs, but rather at communication centers. All these factors make having a network specifically for documenting the Chain of Custody of electronic evidence advantageous.

For example, when vehicles are involved in accidents, the need to take pictures of the accident at the scene as soon as safely possible to do so, can turn out to be critical evidence in both criminal and civil legal court cases. However, given the time that elapses between the date and time that an accident occurs, and the time that the police arrive on the scene of the accident, and the date investigators from both law enforcement and the insurance companies become involved, being able to capture MMS (Multimedia Messaging Service) evidence and immediately have such evidence secured using the NexGen Chain of Custody network can make the difference between having the electronic voice, video, and data communications accepted into evidence at trial and therefore being able to assist in proving an individual's innocence or guilt.

Additionally, in order to be able to prove a person's innocence or guilt when charged with a felony crime, such as robbery or a homicide, it is imperative that related Live Streaming Video, Silent Button, Body Camera. Telematics and Drone Feeds data, etc. (that have captured, even a part of the crime committed) be bagged, sealed and tagged using the long-standing Chain of Custody protocol. Except with more and more cell phones in use, society has become (cell phone) camera ready, as evident from seeing an increased number of photos and videos from crime scenes appearing as part of nightly news stories.

In view of the foregoing problems, it would be particularly advantageous to provide a system that would facilitate establishing, maintaining and documenting the Chain of Custody of voice, video and data communications for both emergency and non-emergency incidents. There is therefore a clear need for establishing NexGen's Chain of Custody Network as a Chain of Custody ecosystem.

Further, coordinating effective multimedia usage with different end users from different agencies using different devices and having differing roles and differing access levels can be a critical resource management nightmare.

BRIEF SUMMARY OF THE INVENTION

It is therefore an object of the invention to provide an emergency response communications apparatus and method for providing a chain of custody of Selected Voice, Selected Video, and Selected Data about an emergency situation that facilitates establishing, maintaining and documenting the Chain of Custody of voice, video and data communications for both emergency and non-emergency incidents.

It is further an object of the invention to provide a multimedia centric event response communications apparatus and method for providing a chain of custody of Selected Voice, Selected Video, and Selected Data about an event that facilitates establishing, maintaining and documenting the Chain of Custody of voice, video and data communications for both emergency and non-emergency incidents.

According to a system aspect of the invention, a computer-based system for sending and receiving information about an emergency situation (and non-emergency situation) is provided which comprises at least one network connected computer system having a processor, machine readable memory, at least one computer application program, a database, and computer network and telecommunications components for delivering and receiving data.

The system, in one configuration, is configured to receive a first emergency communication at a communications center from a user operated mobile communications device transmitting the communication to a network in data communication with the communications center, the first emergency communication being associated with an emergency incident.

The system is further configured to execute an operator interface, which includes a graphical user interface and administrative tools, at a communications center computer or tablet or other wired/wireless appliance for allowing an operator to generate an electronic data request message querying the user to respond thereto with audio, text, photographic, and/or video and data files about the emergency situation, the data files being stored on the user operated mobile communications device or at a location remote from the user operated mobile communications device.

The system is further configured to transmit the electronic data request message from the communications center via the computer connected network to the user operated mobile communications device.

The system is further configured to receive a second emergency communication at the communications center, the second emergency communication being a user executed response to the data request message and including audio, text, photographic, and/or video and data files about the emergency situation retrieved from the user operated mobile communications device or location remote from the user operated mobile communications device.

A unique aspect of Applicant's multimedia centric adaptive emergency response messaging apparatus and method solution is that when using it the Text Control Center (TCC) passes the Text-to-911 message directly to Applicant's solution [also referred to as NexGen's Emergency Services IP Network (ESInet)]. This network, called the RID (Receive, Identify & Distribute) Network by NexGen, is compatible with key emergency response data communication architectures (such as PSAPs, TCCs, and Computer Aided Dispatch sites) and can directly feed data to these end users across various architectures, by receiving and applying dynamic inputs/outputs (such as hardware/software protocols, agency rules, user profiles, jurisdiction resource info access, etc.).

Other novel features which are characteristic of the apparatus, as to organization and method of operation, together with further objects and advantages thereof will be better understood from the following description considered in connection with the accompanying figures, in which preferred embodiments of the apparatus are illustrated by way of example. It is to be expressly understood, however, that the figures are for illustration and description only and is not intended as a definition of the limits of the apparatus. The various features of novelty which characterize the apparatus are pointed out with particularity in the claims annexed to and forming part of this disclosure. The apparatus resides not in any one of these features taken alone, but rather in the particular combination of all of its structures for the functions specified.

BRIEF DESCRIPTION OF THE DRAWINGS

The apparatus will be better understood and objects other than those set forth above will become apparent when consideration is given to the following detailed description thereof. Such description refers to the annexed drawings, wherein:

FIG. 4 is an example of exemplary elements of the unique chain of custody identifier.
FIG. 5 is an example of exemplary elements of the unique chain of custody identifier.
FIG. 6 is an example of the Admissible data table.
FIG. 7 is an example of the RID data table.
FIG. 9 identifies the various USER device configurations, roles of users, and applicable software.

DETAILED DESCRIPTION OF THE INVENTION

Figure 1B:
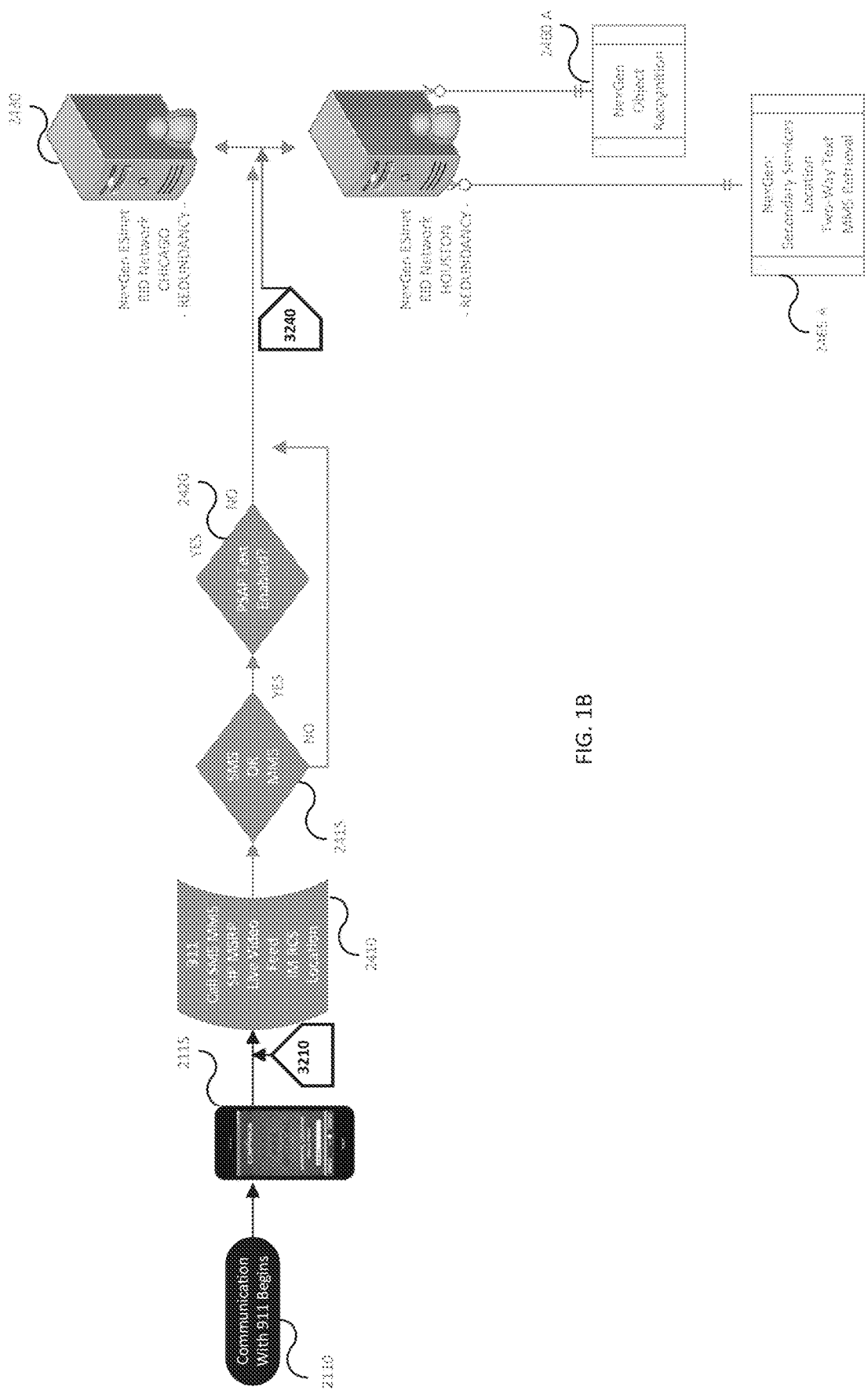
FIG. 1B presents the 911 call to the RID Network path.
Figure 1C:
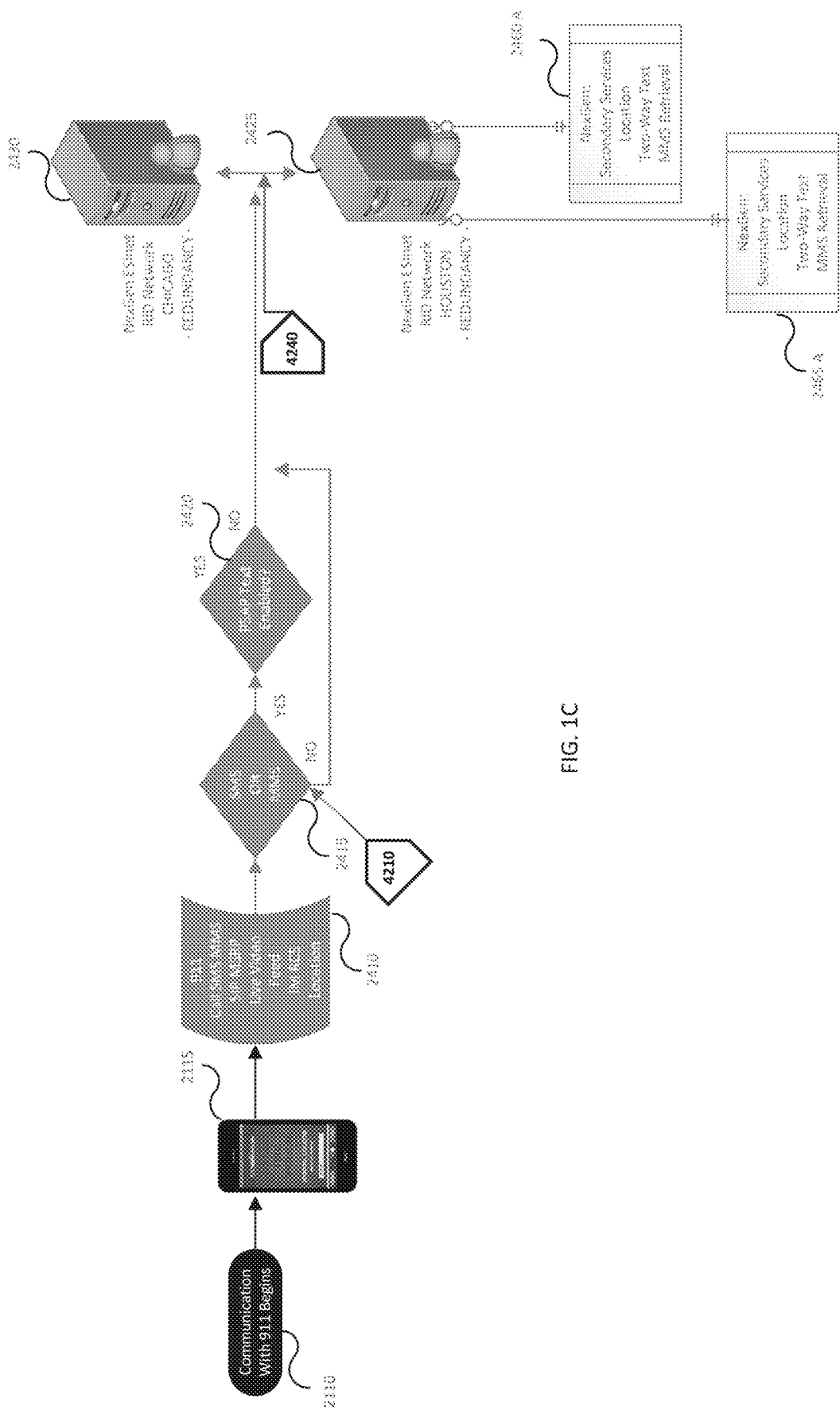
FIG. 1C presents the direct call to the RID Network path.
Figure 1D:
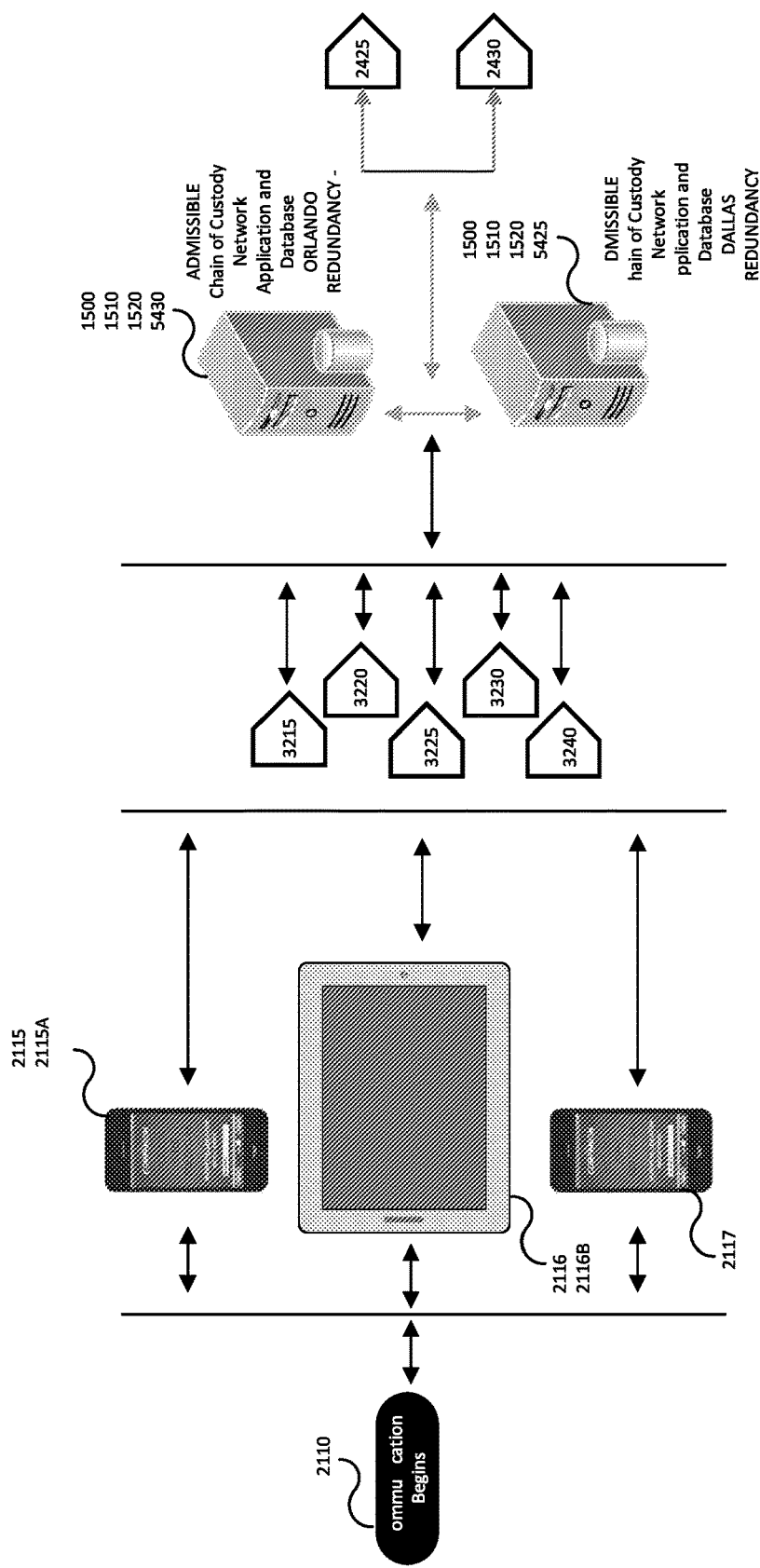
FIG. 1D the 911 call to the Chain of Custody network path.
Figure 2:
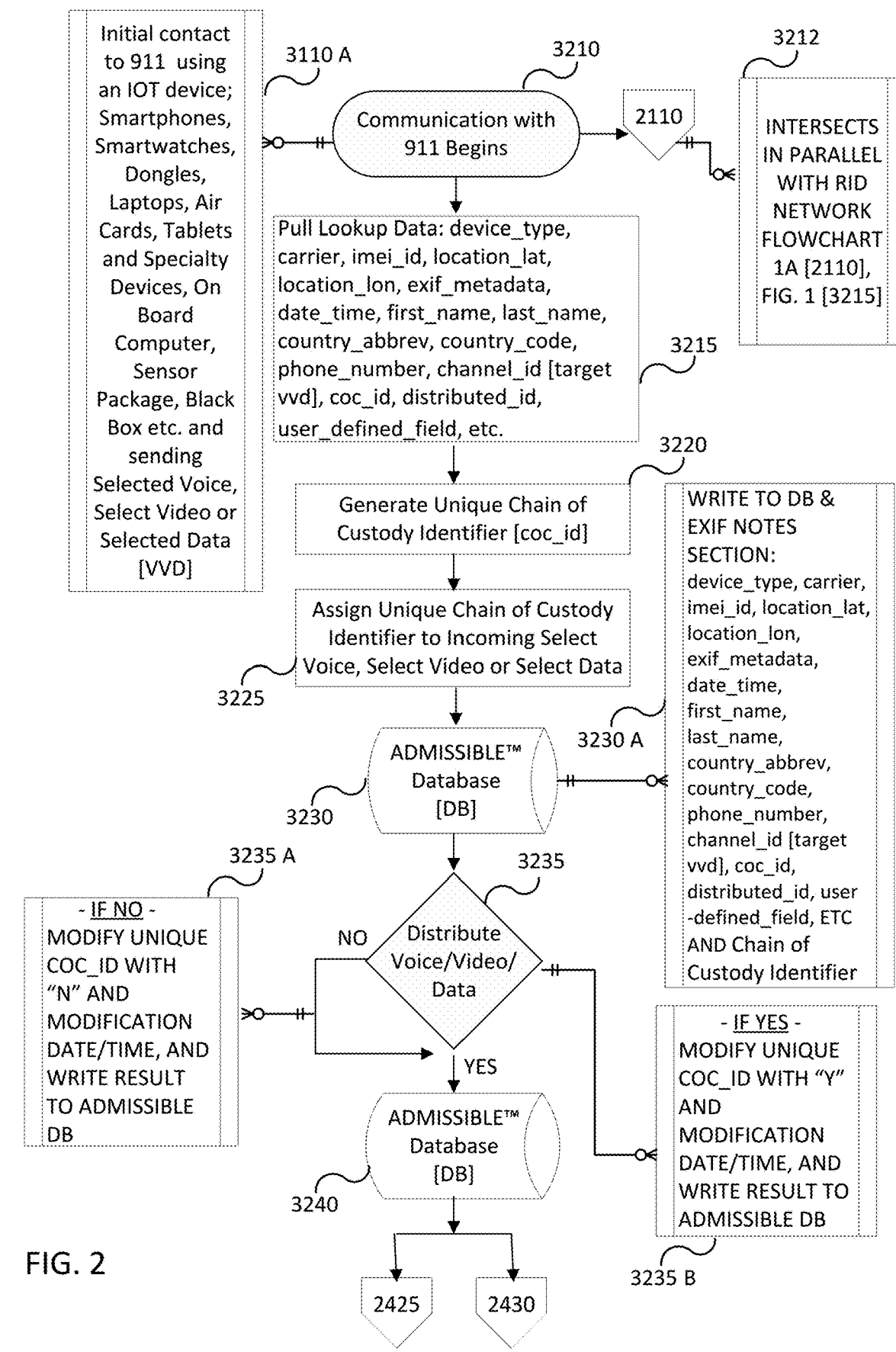
FIG. 2 presents the 911 call to the Chain of Custody network path.

Referring now to FIG. 1B, FIG. 1D, and FIG. 2, in an exemplary and preferred embodiment presented is an emergency response communications apparatus and method for providing a chain of custody of Selected Voice, Selected Video, and Selected Data about an emergency situation, the method being executed by a network connected computer system (10) [such as, for non-limiting exemplary purposes, the NexGen ESInet RID Services Network is herein incorporated in its entirety from the parent application of this Continuation-In-Part] having at least a processor (not shown), a machine-readable memory (not shown), and a Chain of Custody Network (1500) which includes at least an Admissible Content Database (1510) and a chain of custody computer application (1520).

FIG. 9 identifies the various USER device configurations, roles of users, and applicable software.

The method comprising: providing at least one Citizen user device (2115) running a Citizen computer program application (2115A) which communicates Selected Voice, Selected Video, and Selected Data from a group consisting of Multimedia Message Service/MMS, Short Message Service/SMS, Uniform Resource Locator/URL, Live Video, 1G up to 7G data, Location information, voice communications, communication signals, and device control signals with the network connected computer.

The method further comprising providing a first First Responder communications device (2116) for communicating through the network connected computer system with at least one Citizen user device (2115), the first First Responder communications device (2116) running a First Responder computer program application (2116B) which communicates data selected from the group consisting of Multimedia Message Service/MMS, Short Message Service/SMS, Uniform Resource Locator/URL, Live Video, 1G up to 7G data, Location information, voice communications, communication signals, and device control signals with the network connected computer.

The method further comprising providing a second First Responder communications device (2117) for communicating through the network connected computer system with the first First Responder communications device (2116) and the at least one Citizen user device (2115), the second First Responder communications device (2117) running the First Responder computer program application (2116B) which communicates data selected from the group consisting of Multimedia Message Service/MMS, Short Message Service/SMS, Uniform Resource Locator/URL, Live Video, 1G up to 7G data, Location information, voice communications, communication signals, and device control signals with the network connected computer.

The method further comprising configuring the first First Responder communications device (2116) to operate in a First Responder—Watch Commander Mode (2116WC).

The method further comprising configuring the second First Responder communications device (2117) to operate in a First Responder—Field Agent Mode (2117FA).

The method further comprising authenticating the use of the Watch Commander Mode (2116WC) set First Responder communications device (2116) to operate based on a predefined Watch Commander user profile.

The method further comprising authenticating the use of the Field Agent Mode (2117FA) set second First Responder communications device (2117) to operate based on a predefined Field Agent user profile.

The method further comprising wherein the First Responder computer program application (2116B) is functionally compatible with the Citizen computer program application (2115A).

During typical usage a user of the at least one Citizen user device (2115) contacts and transmits data to a Public Service Answering Point (2410), the data selected from the group consisting of Multimedia Message Service/MMS, Short Message Service/SMS, Uniform Resource Locator/URL, Live Video, 3G up to 7G data, Location information, voice communications, communication signals, and device control signals.

The Public Service Answering Point (2410/2610), in accordance with its capabilities receives and transmits the selected data across the network connected computer system (10) between the Watch Commander Mode (2116WC) set communications device (2116) and the at least one Citizen user device (2115).

The Watch Commander Mode (2116WC) set communications device (2116) further transmits and receives the selected data across the network connected computer system (10) between the at least one Citizen user device (2115) and the Field Agent Mode (2117FA) set communications device (2117).

The Watch Commander Mode (2116WC) set communications device (2116) can remotely control the at least one Citizen user device (2115) by use of the data and device control signals exchanged between the devices.

The Field Agent Mode (2117FA) set communications device (2117) can remotely control the at least one Citizen user device (2115) by use of the device control signals exchanged between the devices.

After communications with 911 begins (3210), such as when a Citizen User connects to the network connected computer system (10) using an at least one Citizen user device (2115), the chain of custody computer application (1520) preforms a lookup process (3215) which selectively pulls lookup data from the at least one Citizens user device (2115), the first First Responder communications device (2116), and the second First Responder communications device (2117).

The chain of custody computer application (1520) then generates (3220) a Unique Chain of Custody Identifier (coc_id)/(1010) using selected groups of lookup data (11B).

The Unique Chain of Custody Identifier (1010) is assigned (3225) to incoming Selected Voice, Selected Video, or Selected Data as Tagged Content (1050). Data (resident on the at least one Citizen user device (2115) or streaming into the device) selected as incoming to be later tagged can be filtered using predetermined profiles or manually set using the Administrative tools of graphical user Interface.

The Tagged Content (1050) is submitted (3230) to the Admissible Content Database (1510) via the Chain of Custody Network (1500).

The chain of custody computer application (1520) determines (3235—using predetermined profiles or manually set using the Administrative tools of graphical user Interface, FIG. 9) and denotes (3235A/3235B) whether or not the Tagged Content (1050) will be made able for distribution within the network connected computer system (10) by appending the Unique Chain of Custody Identifier (coc_id)/(1010) with a "Y" or "N" to denote whether or not the data is distributable. Decisions of whether or not to flag the Tagged Data as distributable are made on a case-by-case basis such as whether an incident has been assigned a case number, whether or not police or emergency responders have been dispatched, if there is an arrest, or upon request.

The appended Unique Chain of Custody Identifier (coc_id)/(1010) is then resubmitted (3240) to the Admissible Content Database (1510), and the network connected computer system (10) via the Chain of Custody Network (1500/2425/2430). Further distribution of the Tagged Data with be influenced by the denoted ("Y"/"N") distribution status.

The Watch Commander Mode (2116WC) set communications device (2116) can selectively take control of the at least one Citizen user device's (2115) features and its functions including: live video streaming, microphone use, speaker use, use of applications, installation or removal of applications, use of sensors, and access, reading, or writing of stored data.

The Field Agent Mode (2117FA) set communications device (2117) can selectively take control of the at least one Citizen user device's (2115) features and its functions including: live video streaming, microphone use, speaker use, use of applications, installation or removal of applications, use of sensors, and access, reading, or writing of stored data.

The Watch Commander Mode (2116WC) set communications device (2116) can selectively enable or disable the features and functions of the at least one Citizen user device (2115) that the Citizen user can control.

The Watch Commander Mode (2116WC) set communications device (2116) can selectively enable or disable the features and functions of the at least one Citizen user device (2115) that the Field Agent Mode (2117FA) set communications device (2117) can control.

The Field Agent Mode (2117FA) set communications device (2117) selectively enables or disables the features and functions of the at least one Citizen user device (2115) that the Citizen user can control.

A list of accessible device resources of the at least one Citizen user device (2115) is provided to the first First Responder communications device (2116) and/or the second First Responder communications device (2117) during communications between devices.

Alternate Embodiment 1

It is understood the above apparatus and methods of the preferred embodiment can be configured for use by only a single Citizen User and a single First Responder, or multiple Citizens Users and a single First Responder or Multiple Citizen Users and Multiple First Responders. In an exemplary embodiment 1, apparatus and methods of the preferred embodiment includes a Citizen User and a single First Responder whose communication device is configured in a Watch Commander mode.

Alternate Embodiment 2

Figure 1E:
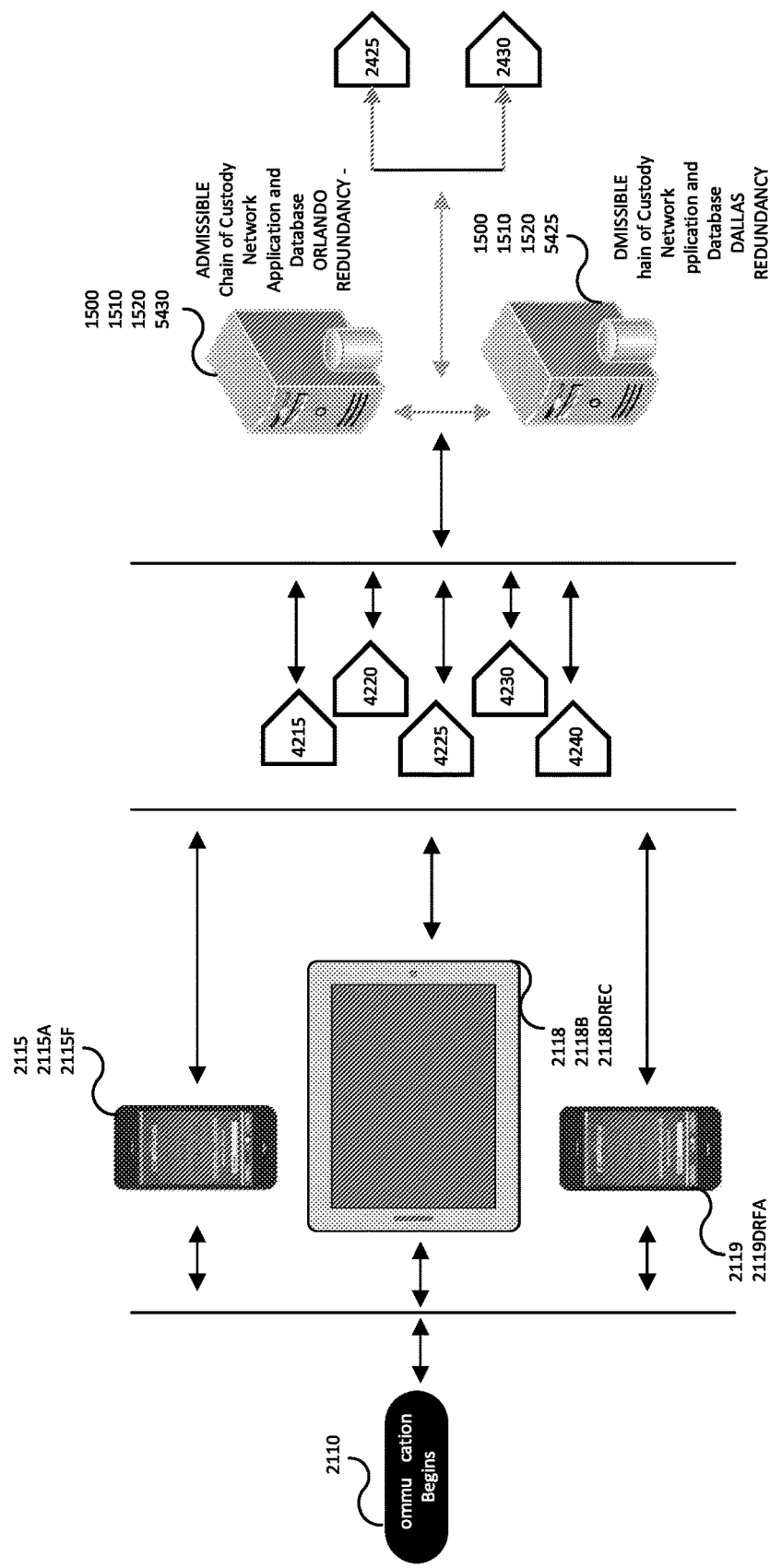
FIG. 1E presents the direct call to the Chain of Custody network path.
Figure 3:
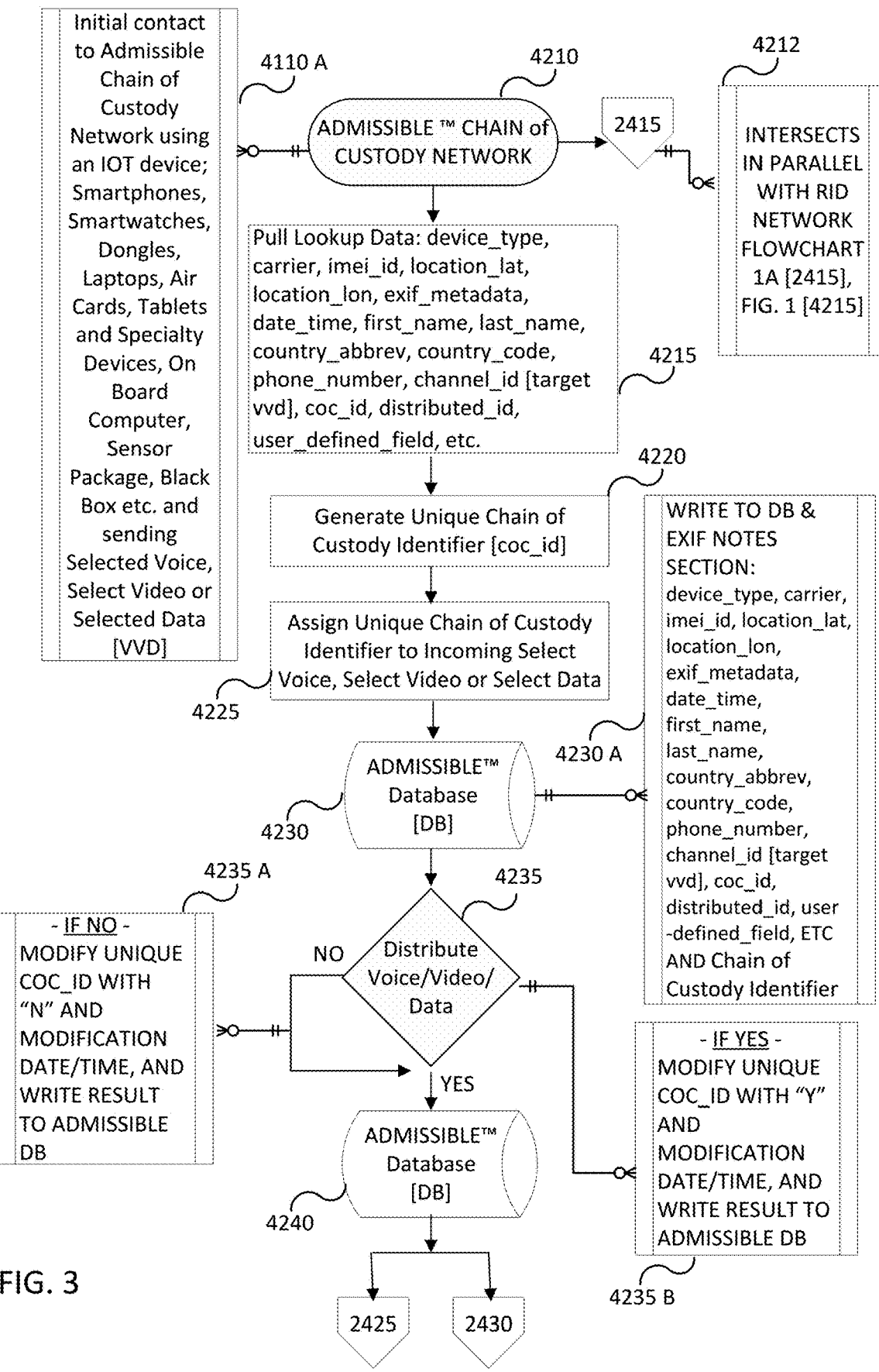
FIG. 3 presents the direct call to the Chain of Custody network path.

Referring now to FIG. 1C, FIG. 1E, and FIG. 3, an alternate embodiment is presented as a multimedia centric event response communications apparatus and method for providing a chain of custody of Selected Voice, Selected Video, and Selected Data about an event, the method being executed by a network connected computer system (10) [such as, for non-limiting exemplary purposes, the NexGen ESInet RID Services Network herein incorporated in its entirety from the parent application of this Continuation-In-Part] having at least a processor (not shown), a machine-readable memory (not shown), and a Chain of Custody Network (1500) which includes at least an Admissible Content Database (1510) and a chain of custody computer application (1520).

FIG. 9 identifies the various USER device configurations, roles of users, and applicable software.

The method comprising: providing at least one Citizen user device (2115) running a Citizen computer program application (2115A) which communicates Selected Voice, Selected Video, and Selected Data from a group consisting of Multimedia Message Service/MMS, Short Message Service/SMS, Uniform Resource Locator/URL, Live Video, 1G up to 7G data, Location information, voice communications, communication signals, and device control signals with the network connected computer.

The method further comprising providing a USER 1 communications device (2118) for communicating through the network connected computer system with at least one Citizen user device (2115), the USER 1 communications device (2118) running a Data Retriever computer program application (2118B) which communicates data selected from the group consisting of Multimedia Message Service/MMS, Short Message Service/SMS, Uniform Resource Locator/URL, Live Video, 1G up to 7G data, Location information, voice communications, communication signals, and device control signals with the network connected computer.

The method further comprising providing a USER 2 communications device (2119) for communicating through the network connected computer system with the USER 1 communications device (2118) and the at least one Citizen user device (2115), the USER 2 communications device (2119) running the Data Retriever computer program application (2118B) which communicates data selected from the group consisting of Multimedia Message Service/MMS, Short Message Service/SMS, Uniform Resource Locator/URL, Live Video, 1G up to 7G data, Location information, voice communications, communication signals, and device control signals with the network connected computer.

The method further comprising configuring the USER 1 communications device (2118) to operate in a Data Retriever—Event Commander Mode (2118DREC).

The method further comprising configuring the USER 2 communications device (2119) to operate in a Data Retriever—Field Agent Mode (2119DRFA).

The method further comprising authenticating the use of the Event Commander Mode (2118DREC) set Data Retriever communications device (2118) to operate based on a predefined Event Commander user profile.

The method further comprising authenticating the use of the Field Agent Mode (2119DRFA) set Data Retriever communications device to operate based on a predefined Field Agent user profile.

The Data Retriever computer program application (2118B) is functionally compatible with the Citizen computer program application (2115A).

In a typical use, a user of the at least one Citizen user device (2115) contacts and transmits data to the Chain of Custody Network (1500), the data selected from the group consisting of Multimedia Message Service/MMS, Short Message Service/SMS, Uniform Resource Locator/URL, Live Video, 1G up to 7G data, Location information, voice communications, communication signals, and device control signals.

The Chain of Custody Network (1500) receives and transmits data across the network connected computer system (10) between the Event Commander Mode (2118DREC) set communications device (2118) and the at least one Citizen user device (2115).

The Event Commander Mode (2118DREC) set communications device (2118) further transmits and receives data across the network connected computer system (10) between the at least one Citizen user device (2115) and the Field Agent Mode (2119DRFA) set communications device.

The Event Commander Mode (2118DREC) set communications device (2118) can remotely control the at least one Citizen user device (2115) by use of the data and device control signals exchanged between the devices, and The Field Agent Mode (2119DRFA) set communications device (2119) can remotely control the at least one Citizen user device (2115) by use of the device control signals exchanged between the devices.

The chain of custody computer application (1520) preforms a lookup process (4215) which selectively pulls lookup data (11B) from the at least one Citizens user device (2115), the USER 1 communications device (2118), and USER 2 communications device (2119) and generates a Unique Chain of Custody Identifier (coc_id)/(1010) using selected groups of lookup data (11B).

The Unique Chain of Custody Identifier (1010) is assigned (4225) to incoming Selected Voice, Selected Video, or Selected Data as Tagged Content (1050). Data (resident on the at least one Citizen user device (2115) or streaming into the device) selected as incoming to be later tagged can be filtered using predetermined profiles or manually set using the Administrative tools of graphical user Interface.

The Tagged Content (1050) is submitted to the Admissible Content Database (1510) via the Chain of Custody Network (1500).

The chain of custody computer application (1520) determines (3235) and denotes (4235A/4235B) whether or not the Tagged Content (1050 will be made able for distribution within the network connected computer system (10) by appending the Unique Chain of Custody Identifier (coc_id)/(1010) with a "Y" or "N" to denote whether or not the data is distributable.

The appended Unique Chain of Custody Identifier (coc_id)/(1010)) is then resubmitted to the network connected computer system (10) and Admissible Content Database (1500) via the Chain of Custody Network (1500/2425/2430). Further distribution of the Tagged Data with be influenced by the denoted ("Y"/"N") distribution status. Decisions of whether or not to flag the Tagged Data as distributable are made based upon a distribution request approval.

The Event Commander Mode (2115F) set communications device can selectively take control of the at least one Citizen user device's (2115) features and its functions including: live video streaming, microphone use, speaker use, use of applications, installation or removal of applications, use of sensors, and access, reading, or writing of stored data.

The Field Agent Mode (2119DRFA) set communications device (2119) can selectively take control of the at least one Citizen user device's (2115) features and its functions including: live video streaming, microphone use, speaker use, use of applications, installation or removal of applications, use of sensors, and access, reading, or writing of stored data.

The Event Commander Mode (2118DREC) set communications device (2118) can selectively enable or disable the features and functions of the at least one Citizen user device (2115) that the Citizen user can control.

The Event Commander Mode (2118DREC) set communications device (2118) can selectively enable or disable the features and functions of the at least one Citizen user device (2115) that the Field Agent Mode (2119DRFA) set communications device (2119) can control.

The Field Agent Mode (2119DRFA) set communications device (2119) can selectively enable or disable the features and functions of the at least one Citizen user device (2115) that the Citizen user can control.

A list of accessible device resources of the at least one Citizen user device (2115) is provided to the USER 1 communications device (2118) and/or the USER 2 (2119) communications device during communications between devices.

Emergency vs non-emergency contact with the RID (Receive, Identify, Distribute) Network (2425, 2430) and ADMISSIBLE Network (1500, 1510, 1520, 5425, 5430). Irrespective if the Voice, Video or Data communications is as a result of an emergency or non-emergency contact, both forms of communication are received by the RID (Receive, Identify, Distribute) or ADMISSIBLE network via the same Voice, Video or Data receiving point (2110). The applications on the RID (2425, 2430) and ADMISSIBLE (1500, 1510, 1520, 5425, 5430) Networks independently make the distinction between an emergency (3235) or non-emergency (4235) communications. This is accomplished by the networks internally (4335, 4235) depending on the originating channel, the communication is routed through an applicable set of elements (exemplary emergency elements include: 2115, 2115A, 2115F, 2116, 2116B. 2116WC, 2117, 2117FA), (exemplary non-emergency elements include: 2115, 2115A, 2115FA, 2118, 2118B, 2118DREC, 2119, and 2119DRFA).

It is understood the above apparatus and methods of the preferred embodiment can be configured for use by only a single Citizen User and a single Data Retriever, or multiple Citizens Users and a single Data Retriever or Multiple Citizen Users and Multiple Data Retrievers.

Figure 8:
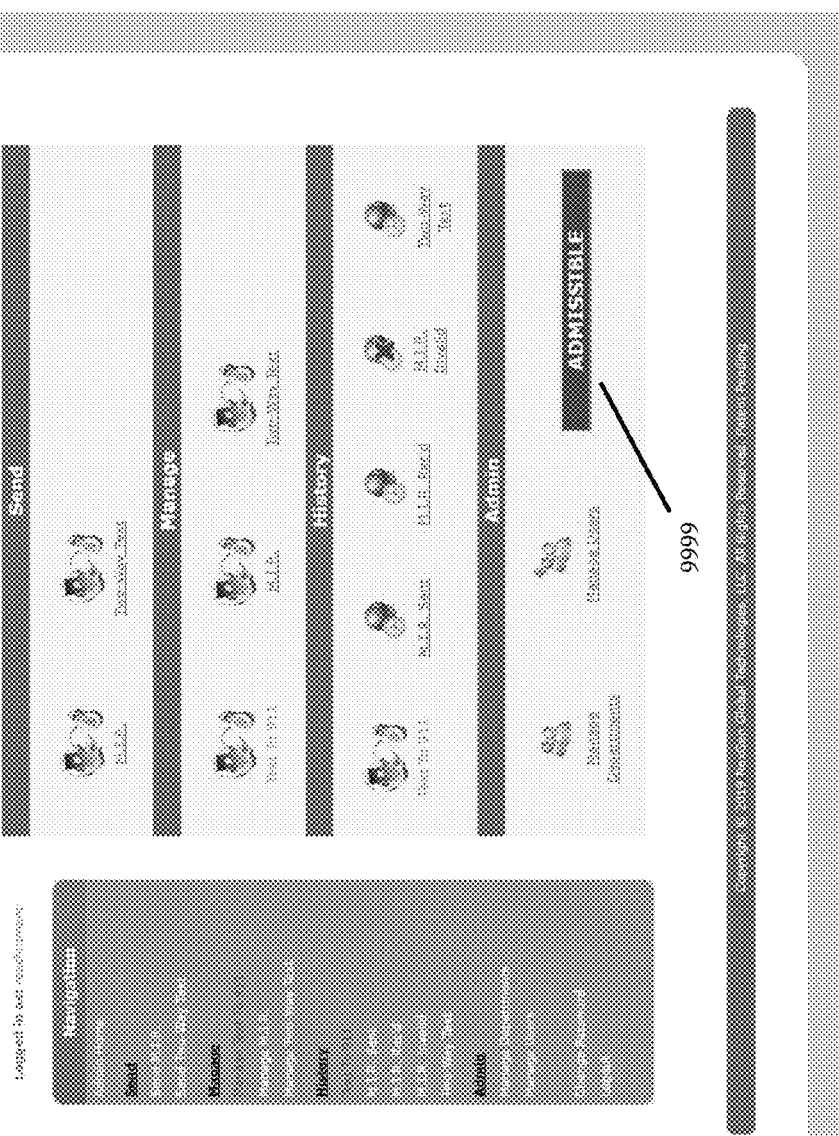
FIG. 8 illustrates Admin Panel indicating active or inactive Chain of Custody functionality.

As shown in FIG. 8, indicator 9999 is provided on a graphical user interface which displays control and informational elements of the chain of custody computer application (1520). Indicator 9999 will bright or dim or change colors (such as red to green or vice versa) to indicate whether the Admissible Content Database (1510) is enabled (available for processing data) or disabled (not available for processing data).

There has thus been broadly outlined the more important features of the apparatus in order that the detailed description thereof that follows may be better understood, and in order that the present contribution to the art may be better appreciated. There are, of course, additional features of the apparatus that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present apparatus. It is important, therefore, that the claims be regarded as including such equivalent constructions insofar as they do not depart from the spirit and scope of the present apparatus.

Further, the purpose of the Abstract is to enable the national patent office(s) and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the apparatus of this application, which is measured by the claims, nor is it intended to be limiting as to the scope of the apparatus in any way.

The foregoing disclosure is sufficient to enable one having skill in the art to practice the apparatus without undue experimentation and provides the best mode of practicing the apparatus presently contemplated by the inventor. While there is provided herein a full and complete disclosure of the preferred embodiments of this apparatus, it is not intended to limit the apparatus to the exact construction, dimensional relationships, and operation shown and described. Various modifications, alternative constructions, changes and equivalents will readily occur to those skilled in the art and may be employed, as suitable, without departing from the true spirit and scope of the apparatus. Such changes might involve alternative materials, components, structural arrangements, sizes, shapes, forms, functions, operational features or the like. Elements of the instant apparatus may be made from a variety of known materials including wood, rubber, metal, or plastic, as well as from any suitable combination of appropriate materials.

It is understood the methods disclosed herein present the system and components which can form the apparatus for performing the methods as claimed and as disclosed. Further the use of the apparatus and system components presented herein can form the basis for the methods presented and claimed herein.

Accordingly, the proper scope of the present apparatus should be determined only by the broadest interpretation of the appended claims so as to encompass all such modifications as well as all relationships equivalent to those illustrated in the drawings and described in the specification.

The invention claimed is:

1. An emergency response communications method for providing a chain of custody of Selected Voice, Selected Video, and Selected Data about an emergency situation, the method being executed by a network connected computer system having a processor, a machine-readable memory, and a Chain of Custody Network which includes at least an Admissible Content Database and a chain of custody computer application, the method comprising:

providing at least one Citizen user device running a Citizen computer program application which communicates Selected Voice, Selected Video, and Selected Data from a group consisting of multimedia service/MMS, Short Message Service/SMS, Uniform Resource Locator/URL, Live Video, Location information, voice communications, communication signals, and device control signals with the network connected computer;

providing a first First Responder communications device for communicating through the network connected computer system with at least one Citizen user device, the first First Responder communications device running a First Responder computer program application which communicates data selected from the group consisting of multimedia service/MMS, Short Message Service/SMS, Uniform Resource Locator/URL, Live Video, Location information, voice communications, communication signals, and device control signals with the network connected computer;

providing a second First Responder communications device for communicating through the network connected computer system with the first First Responder communications device and the at least one Citizen user device, the second First Responder communications device running the First Responder computer program application which communicates data selected from the group consisting of multimedia service/MMS, Short Message Service/SMS, Uniform Resource Locator/URL, Live Video, Location information, voice communications, communication signals, and device control signals with the network connected computer;

configuring the first First Responder communications device to operate in a First Responder—Watch Commander Mode;

configuring the second First Responder communications device to operate in a First Responder—Field Agent Mode;

authenticating the use of the Watch Commander Mode set First Responder communications device to operate based on a predefined Watch Commander user profile;

authenticating the use of the Field Agent Mode set First Responder communications device to operate based on a predefined Field Agent user profile;

wherein the First Responder computer program application is functionally compatible with the Citizen computer program application;

a user of the at least one Citizen user device contacting and transmitting data to a Public Service Answering Point, the data selected from the group consisting of multimedia service/MMS, Short Message Service/SMS, Uniform Resource Locator/URL, Live Video, Location information, voice communications, communication signals, and device control signals;

the Public Service Answering Point receiving and transmitting data across the network between the Watch Commander Mode set communications device and the at least one Citizen user device;

the Watch Commander Mode set communications device further transmitting and receiving data across the network between the at least one Citizen user device and the Field Agent Mode set communications device;

wherein the Watch Commander Mode set communications device can remotely control the at least one Citizen user device by use of the data and device control signals exchanged between the devices, and wherein the Field Agent Mode set communications device can remotely control the at least one Citizen user device by use of the device control signals exchanged between the devices, wherein the chain of custody computer application preforms a lookup process which selectively pulls lookup data from the at least one Citizens user device, the first First Responder communications device, and second First Responder communications device and generates a Unique Chain of Custody Identifier using selected groups of lookup data;

wherein the Unique Chain of Custody Identifier is assigned to incoming Selected Voice, Selected Video, or Selected Data as Tagged Content;

wherein the Tagged Content is submitted to the Admissible Content Database via the Chain of Custody Network;

wherein the chain of custody computer application determines and denotes whether or not the Tagged Content will be made able for distribution within the network connected computer system by appending the Unique Chain of Custody Identifier;

wherein the appended Unique Chain of Custody Identifier is then resubmitted to the network connected computer system and Admissible Content Database via the Chain of Custody Network.

2. The emergency response communications method of claim 1, wherein the Watch Commander Mode set communications device selectively takes control of the at least one Citizen user device's features and its functions including: live video streaming, microphone use, speaker use, use of applications, installation or removal of applications, use of sensors, and access, reading, or writing of stored data.

3. The emergency response communications method of claim 1, wherein the Field Agent Mode set communications device selectively takes control of the at least one Citizen user device's features and its functions including: live video streaming, microphone use, speaker use, use of applications, installation or removal of applications, use of sensors, and access, reading, or writing of stored data.

4. The emergency response communications method of claim 1, wherein the Watch Commander Mode set communications device selectively enables or disables the features and functions of the at least one Citizen user device that the Citizen user can control.

5. The emergency response communications method of claim 1, wherein the Watch Commander Mode set communications device selectively enables or disables the features and functions of the at least one Citizen user device that the Field Agent Mode set communications device can control.

6. The emergency response communications method of claim 1, wherein the Field Agent Mode set communications device selectively enables or disables the features and functions of the at least one Citizen user device that the Citizen user can control.

7. The emergency response communications method of claim 1, wherein a list of accessible device resources of the at least one Citizen user device is provided to the first First Responder communications device and/or the second First Responder communications device during communications between devices.

8. An emergency response communications method for providing a chain of custody of voice, video, and data about an emergency situation, the method being executed by a network connected computer system having a processor and machine-readable memory, the method comprising:

providing at least one Citizen user device running a Citizen computer program application which communicates data across the network connected computer selected from the group consisting of multimedia service/MMS, Short Message Service/SMS, Uniform Resource Locator/URL, Live Video, Location information, voice communications, communication signals, and device control signals with the network connected computer;

configuring the at least one Citizen user device to operate the Citizen computer program application including transmitting across the network connected computer information of the features, functions, sensors, and data remotely accessible on the device;

providing at least one First Responder communications device for communicating through the network connected computer system with at least one Citizen user device, the First Responder communications device running a computer program application which communicates data selected from the group consisting of multimedia service/MMS, Short Message Service/SMS, Uniform Resource Locator/URL, Live Video, Location information, voice communications, communication signals, and device control signals with the network connected computer;

executing a First Responder computer program application on the at least one First Responder communications device;

configuring the at least one First Responder communications device to operate the First Responder computer program application in a First Responder Watch Commander Mode;
wherein configuring the at least one First Responder communications device to operate the First Responder computer program application includes transmitting across the network connected computer system the features, functions, sensors, and data remotely accessible on the device;
authenticating, via the First Responder computer program application, the use of the Watch Commander Mode set First Responder communications device to operate based on a predefined Watch Commander user profile;
wherein the First Responder computer program application is functionally compatible with the Citizen computer program application;
contacting a Public Service Answering Point and transmitting data of a user of the at least one Citizen user device to the Public Service Answering Point, the data selected from the group consisting of multimedia service/MMS, Short Message Service/SMS, Uniform Resource Locator/URL, Live Video, Location information, voice communications, communication signals, and device control signals;
passing the data from the at least one Citizen user device from the Public Service Answering Point to the Watch Commander Mode set communications device through the network connected computer system;
wherein the Watch Commander Mode set communications device can remotely control the at least one Citizen user device by use of the data and device control signals exchanged between the devices, and
wherein the Watch Commander Mode set communications device can remotely control other at least one First Responder user device by use of the data and device control signals exchanged between the devices.

9. The emergency response communications method of claim 8,
wherein the at least one First Responder communications device can be configured to operate in a selected Specified First Responder Mode, the selectable Specified First Responder Modes including: First Responder Watch Commander, First Responder Field Agent, First Responder Fire Team Member, First Responder Medical Team Member, First Responder Hazardous Material Team Member, First Responder Bomb Squad Team Member, First Responder Crowd Management Team Member, First Responder Communications Team Member, First Responder Technical Support Team Member, and First Responder General Support Team Member.

10. The emergency response communications method of claim 9,
wherein the Watch Commander Mode set communications device selectively takes control of the at least one Citizen user device's features and its functions including: live video streaming, microphone use, speaker use, use of applications, installation or removal of applications, use of sensors, and access, reading, or writing of stored data.

11. The emergency response communications method of claim 9, wherein the Watch Commander Mode set communications device selectively takes control of any of the other at least one First Responder communications device which is configured to operate in a Specified First Responder Mode, and
wherein the Watch Commander Mode set communications device selectively controls any chosen Specified First Responder Mode set communications device's relevant features and functions including: live video streaming, microphone use, speaker use, use of applications, installation or removal of applications, use of sensors, and access, reading, or writing of stored data.

12. The emergency response communications method of claim 9, further including the First Responder computer program application authenticating the use of any at least one First Responder communications device which has been configured to operate in a Specified First Responder Mode operate based on a predefined Specified First Responder Mode user profile applicable to the selected Specified First Responder Mode.

13. The emergency response communications method of claim 8, wherein a list of accessible device resources of the at least one Citizen user device is provided to at least one First Responder communications device during communications between devices.

14. A multimedia centric event response communications method for providing a chain of custody of Selected Voice, Selected Video, and Selected Data about an event, the method being executed by a network connected computer system having a processor, a machine-readable memory, and a Chain of Custody Network which includes at least an Admissible Content Database and a chain of custody computer application, the method comprising:
providing at least one Citizen user device running a Citizen computer program application which communicates Selected Voice, Selected Video, and Selected Data from a group consisting of multimedia service/MMS, Short Message Service/SMS, Uniform Resource Locator/URL, Live Video, Location information, voice communications, communication signals, and device control signals with the network connected computer;
providing a USER 1 communications device for communicating through the network connected computer system with at least one Citizen user device, the USER 1 communications device running a Data Retriever computer program application which communicates data selected from the group consisting of multimedia service/MMS, Short Message Service/SMS, Uniform Resource Locator/URL, Live Video, Location information, voice communications, communication signals, and device control signals with the network connected computer;
providing a USER 2 communications device for communicating through the network connected computer system with the USER 1 communications device and the at least one Citizen user device, the USER 2 communications device running the Data Retriever computer program application which communicates data selected from the group consisting of multimedia service/MMS, Short Message Service/SMS, Uniform Resource Locator/URL, Live Video, Location information, voice communications, communication signals, and device control signals with the network connected computer;
configuring the USER 1 communications device to operate in a Data Retriever—Event Commander Mode;
configuring the USER 2 communications device to operate in a Data Retriever—Field Agent Mode;
authenticating the use of the Event Commander Mode set Data Retriever communications device to operate based on a predefined Event Commander user profile;

authenticating the use of the Field Agent Mode set Data Retriever communications device to operate based on a predefined Field Agent user profile;

wherein the Data Retriever computer program application is functionally compatible with the Citizen computer program application;

a user of the at least one Citizen user device contacting and transmitting data to a Chain of Custody Network, the data selected from the group consisting of multimedia service/MMS, Short Message Service/SMS, Uniform Resource Locator/URL, Live Video, Location information, voice communications, communication signals, and device control signals;

the Chain of Custody Network receiving and transmitting data across the network between the Event Commander Mode set communications device and the at least one Citizen user device;

the Event Commander Mode set communications device further transmitting and receiving data across the network between the at least one Citizen user device and the Field Agent Mode set communications device;

wherein the Event Commander Mode set communications device can remotely control the at least one Citizen user device by use of the data and device control signals exchanged between the devices, and wherein the Field Agent Mode set communications device can remotely control the at least one Citizen user device by use of the device control signals exchanged between the devices, wherein the chain of custody computer application preforms a lookup process which selectively pulls lookup data from the at least one Citizens user device, the USER 1 communications device, and USER 2 communications device and generates a Unique Chain of Custody Identifier using selected groups of lookup data;

wherein the Unique Chain of Custody Identifier is assigned to incoming Selected Voice, Selected Video, or Selected Data as Tagged Content;

wherein the Tagged Content is submitted to the Admissible Content Database via the Chain of Custody Network;

wherein the chain of custody computer application determines and denotes whether or not the Tagged Content will be made able for distribution within the network connected computer system by appending the Unique Chain of Custody Identifier;

wherein the appended Unique Chain of Custody Identifier is then resubmitted to the network connected computer system and Admissible Content Database via the Chain of Custody Network.

15. The multimedia centric event response communications method of claim 14, wherein the Event Commander Mode set communications device selectively takes control of the at least one Citizen user device's features and its functions including: live video streaming, microphone use, speaker use, use of applications, installation or removal of applications, use of sensors, and access, reading, or writing of stored data.

16. The multimedia centric event response communications method of claim 14, wherein the Field Agent Mode set communications device selectively takes control of the at least one Citizen user device's features and its functions including: live video streaming, microphone use, speaker use, use of applications, installation or removal of applications, use of sensors, and access, reading, or writing of stored data.

17. The multimedia centric event response communications method of claim 14, wherein the Event Commander Mode set communications device selectively enables or disables the features and functions of the at least one Citizen user device that the Citizen user can control.

18. The multimedia centric event response communications method of claim 14, wherein the Event Commander Mode set communications device selectively enables or disables the features and functions of the at least one Citizen user device that the Field Agent Mode set communications device can control.

19. The multimedia centric event response communications method of claim 14, wherein the Field Agent Mode set communications device selectively enables or disables the features and functions of the at least one Citizen user device that the Citizen user can control.

20. The multimedia centric event response communications method of claim 14, wherein a list of accessible device resources of the at least one Citizen user device is provided to the USER 1 communications device and/or the USER 2 communications device during communications between devices.

* * * * *